Feb. 10, 1953 R. L. BAER 2,628,027
INSURANCE CALCULATOR
Filed July 29, 1950 3 Sheets-Sheet 1

Inventor
ROBERT L. BAER
By J. W. Greenhow
Attorney

Patented Feb. 10, 1953

2,628,027

UNITED STATES PATENT OFFICE 2,628,027

INSURANCE CALCULATOR

Robert L. Baer, Bloomfield, N. J., assignor to The Colonial Life Insurance Company of America, East Orange, N. J., a corporation of New Jersey Application July 29, 1950, Serial No. 176,641

1 Claim. (Cl. 235—88)

This invention relates to the method of ascertaining a given figure in relation to selected predetermined figures and to a device for quickly and conveniently correlating one figure with another to give the result sought.

The invention has its primary use in the field of life insurance and serves to enable an insurance agent, after mustering a group of facts and conditions, to convert this assembly of information into concrete simplified form.

In accomplishing the above a device is provided wherein certain calculated data is assembled on a sheet. The sheet is received in a transparent envelope or panel provided with rotatable dials or disks. The disks are so arranged and constructed that by rotating a disk and directing one portion thereof to align with certain indicia, another portion of the disk will be positioned and aligned to indicate certain other indicia giving the result desired.

Figure 1:
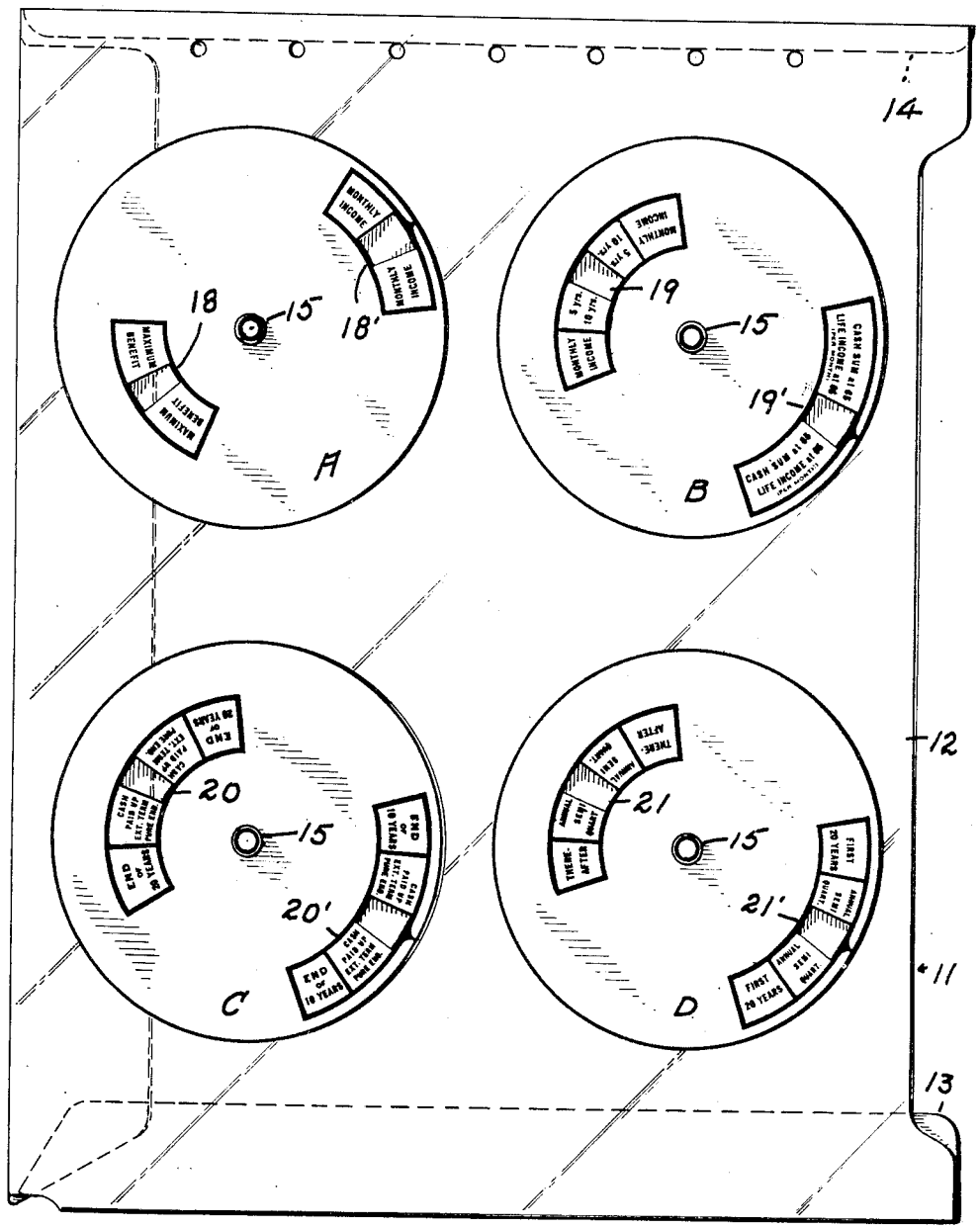

The invention will be more fully understood by reference to the following description together with the accompanying drawing, in which Fig. 1 is a side view of a transparent envelope or panel provided with rotatable opaque disks or dials so arranged as to cooperate with a card or plate when inserted in the envelope.

Figure 2:
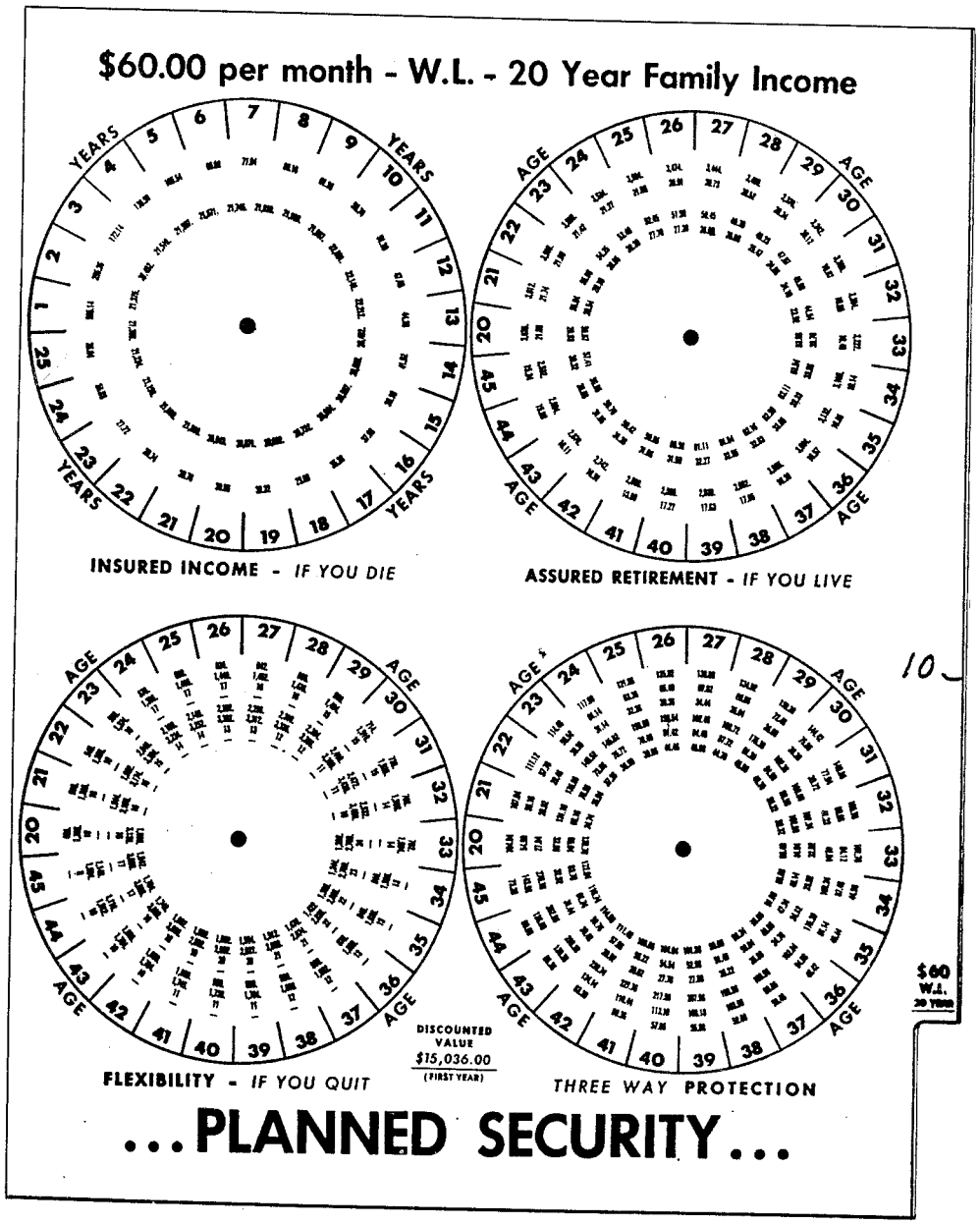
Figure 3:
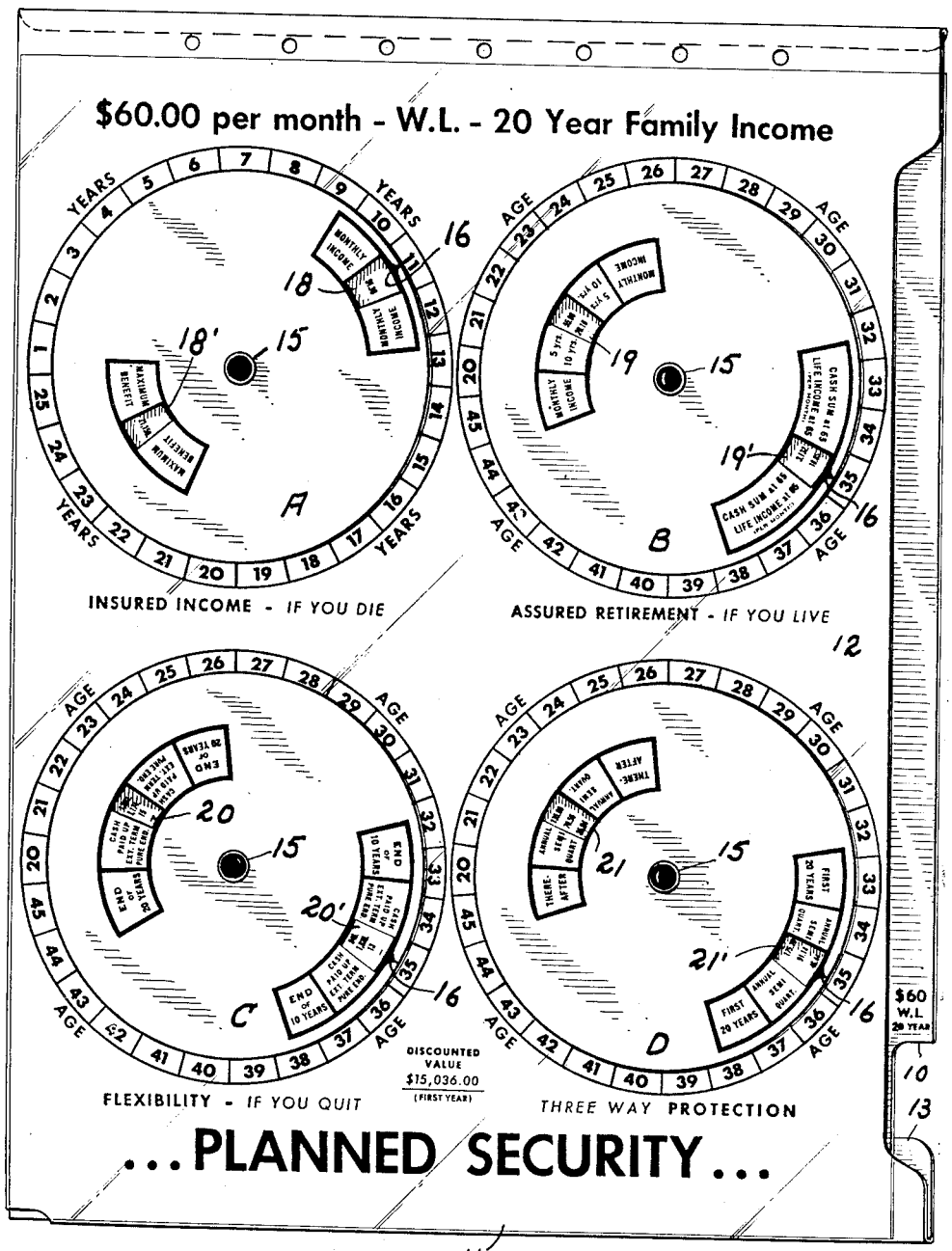

Fig. 2 is a front view of a card or plate for insertion into the transparent envelope, and Fig. 3 is a front side view of a transparent envelope with a card inserted therein, the card being visible through the wall of the envelope.

As stated above, when given certain figures, the present invention makes possible the rapid and accurate calculation to obtain numerical answers to selected questions raised by reason of different combinations of the known figures. In the field of life insurance the prospect to be insured is, of course, interested in terms and benefits. The benefits, of course vary depending on conditions such as age, term of payments, benefits after payments over a period of years, death at different ages, etc., etc. The insurance agent is therefore confronted with complicated mathematical problems which ordinarily must be worked out during the interview with the prospect.

It can readily be understood that relatively complicated problems will arise and unless the agent is exceptionally quick and accurate the interview becomes tedious to the prospect who may in some cases lose interest. In any event the agent is desirous to produce the correct answers in the shortest time to the benefit of all concerned.

The present invention makes it possible to make an expeditious analysis of an individual's life insurance program in a manner as to be readily comprehended by the individual and to point out the need for additional insurance on the basis of a simple formula namely; what the individual wants, minus what he has equals what he still needs.

Ordinarily in order to complete the figures for proposed additional insurance the agent would be required to spend appreciable time and effort. With the calculator constructed in accordance with the present invention the required results are attained in the absence of error and time consuming mathematical effort.

For example, consider a family of husband, age 35, wife, age 34, youngest child, age 2. It has been established that this family requires $60.00 per month additional income for a 20 year period in the event of the death of the husband.

The agent is supplied with a given calculated proposal to the effect that should death occur between 1950 and 1970 the beneficiary would have an income of $60.00 for a 20 year period, then a cash lump sum of $6000.00. This is the basis for this particular case. The agent is, however, faced with the problem of answering as to what income could be received if the $6000.00 were paid as monthly income over say 11 years.

The agent, therefore, turns to a group of slide cards or plates 10 and selects a $60.00 card as shown in Fig. 2. Any number of cards for different monthly incomes may be provided to meet different situations. It is sufficient for the purpose of describing the invention to explain the device in connection with one card such as card 10 as an example.

The card 10 which may be termed a $60.00 income card is then inserted behind a transparent panel which as shown constitutes one side of what may be termed an envelope 11. (See Fig. 1.) The envelope 11 includes a front wall or panel 12 and rear flanges 13 and 14 to receive and support a plate or card 10 in a given position relative to the wall or panel. The panel or wall 12 of envelope 11 is provided with four opaque disks or dials A, B, C, and D, mounted for rotation on suitable bearings 15 on one side of the panel. These disks may be of similar form and positioned in spaced relation, with their pivot points in rectangular formation. It is of course to be understood that the disks may be mounted in any desired arrangement to meet the requirements of a card when in position as will be explained. Each disk is provided with two transparent windows radially disposed and at different distances from the perimeter of the disk. As shown disk A is provided with windows 18 and 18', disk B is provided with windows 19 and 19', disk C is provided with windows 20 and 20' and disk D is provided with windows 21 and 21'.

The insert card or plate 10 is, as shown, provided with four sets of characters or figures in concentric rows or asteriated arrangement. When the card is inserted in the transparent envelope 11 the opaque portions of the disks cover the radially disposed compiled groups of figures but expose a circular group of figures arranged adjacent to the periphery of the disks. These exposed figures may be termed the control numerals. The radially disposed figures which may be termed calculated or predetermined figures are exposed at will through the windows of the disks. Obviously the windows always permit some radially disposed figures to appear but such exposure is meaningless except in conjunction with the control figures as will be explained.

Having inserted the card 12 the device is ready for use. The question arises, as above mentioned, as to what monthly income can be paid for 11 years and what would be the maximum benefit.

The disk or dial A is moved to bring its pointer 16 to control figure 11 indicating eleven years. Reference to the figure appearing through upper window 18 will show that the monthly amount, indicated by the legend adjacent to the window, is $51.18 or by reference to lower window 18' and its legend, the maximum benefit is $21,156.00.

The next question may be as to what will be received by the individual at age sixty-five. Dial B is then moved to bring its pointer 16 to control figure 35, the age of the individual when insured. By reference to window 19' it will be seen that the amount is $3,132.00 as indicated by the legend in line with the amount, or $18.85 per month for life income as indicated by the legend in line with the lower figure seen through window 19' or by reference to window 19 it will be found that according to the legends $55.09 may be received for five years or $29.00 for ten years.

The next question may refer to the benefit in case the individual wishes to terminate or quit.

The dial C is then moved to bring the indicator or pointer 16 to 35 of the control figures. Referring then to lower window 20' and legend it will be found that the cash value at the end of say ten years is $846.00, paid up value is $1,626.00 and extended insurance is available for term of 13 years.

By reference to the window 20 and legend of dial C it will be found that at the end of twenty years the cash value is $1,992.00, paid up value is $3,174.00 and extended insurance is available for the extended term of fifteen years.

Questions as to premium are answered by reference to dial D. The dial is moved to bring its indicator 16 in register with 35 of the control figures. By referring to window 21' and legend it will be seen that the annual premium for the first twenty years is $175.20, semi-annual premium $91.14 and quarterly premium $46.44.

The annual premium thereafter is found by reference to window 21 and legend as being $135.66, semi-annual premium $70.56 and quarterly premium as $35.94.

It will readily be understood that without the aid of the present invention an agent would be required to refer to his rate book and calculate by multiplying and adding in accordance with the basic rates at the expense of time and effort and in some cases to the annoyance of the prospect. When using the present calculating device it is only necessary for the agent to establish certain basic conditions and employ the calculator to furnish the answers.

Although one example of the use of the calculator has been given, it may be employed to meet the requirements of a multiplicity of different situations and conditions. The cards or plates 10 as above mentioned may be of a number to meet all requirements when inserted behind the panel in the envelope. When read through the windows of the set dials in conjunction with the legends the selected card or plate may be used in conjunction with the dials to solve the problem.

As will be evident from the drawing of card 10, Fig. 2, the present invention provides a novel arrangement and assembly of what may be termed control characters and calculated data. As shown the control characters are for the present purposes in the form of numerals positioned in spaced relation on the circumference of a circle. The diameter of this circle is of such dimension as to locate the said characters in close relation to the edge of a disk or dial having its center of rotation at the center of the circle bounded by the said characters when the card is positioned behind the dials; thus the characters are exposed through the transparent envelope or panel.

The calculated figures are as shown disposed in asteriated or radial rows, each row containing a selected number of figures in spaced relation on a radius from the center of the dial. This calculated data may be compiled in accordance with predeterminations and is obviously the result of extensive figuring based on the information supplied to meet given situations. The answers to specific questions are attained upon the movement of a dial to a given position relative to the control characters whereupon the figures appearing through the windows give the results sought.

As will be noted each dial has two windows of generally rectangular form and radially disposed. One window is relatively close to the outer edge of the dial whereas the other window is closer to the center of the dial. With this arrangement of the windows an upper or outer group of calculated data is exposed to give certain answers or results. Thus by a single movement of the dial, readings can be had of a portion of one radial line of calculated figures viewed through one window and a portion of a different radial line of the calculated figures viewed through the other window as a result of the novel arrangement of the calculated and control figures in conjunction with the movable members or dials. Thus it is possible and convenient to supply answers or results to a plurality of questions.

Although a preferred embodiment of the invention is shown and described herein, it is to be understood that modifications may be made therein without departing from the spirit and scope of the appended claim.

What is claimed is:

An insurance calculator for correlating separate groups of indicia, comprising a transparent panel, an opaque disk, means for rotatably supporting said disk on one side of said panel, said disk having a window exposing a portion of said transparent panel, means for supporting a plate on the other side of said transparent panel, said plate when so supported exposing through said panel one group of indicia around the periphery of said opaque disk and a portion of another group of indicia exposed through said window and said panel, whereby a rotation of said disk to a selected position serves to correlate a portion of one of said groups of indicia with a portion of the other group to obtain a calculated answer to an insurance problem.

ROBERT L. BAER.

REFERENCES CITED

The following references are of record in the file of this patent:

UNITED STATES PATENTS

| Number | Name | Date |
|---|---|---|
| 998,603 | Diefenback | July 25, 1911 |
| 1,354,375 | Braly | Sept. 28, 1920 |
| 1,907,677 | Schroeder et al. | May 9, 1933 |
| 1,989,353 | Davis | Jan. 29, 1935 |
| 2,216,490 | Garrett | Oct. 1, 1940 |

FOREIGN PATENTS

| Number | Country | Date |
|---|---|---|
| 271,335 | Great Britain | May 26, 1927 |